Figure 1:
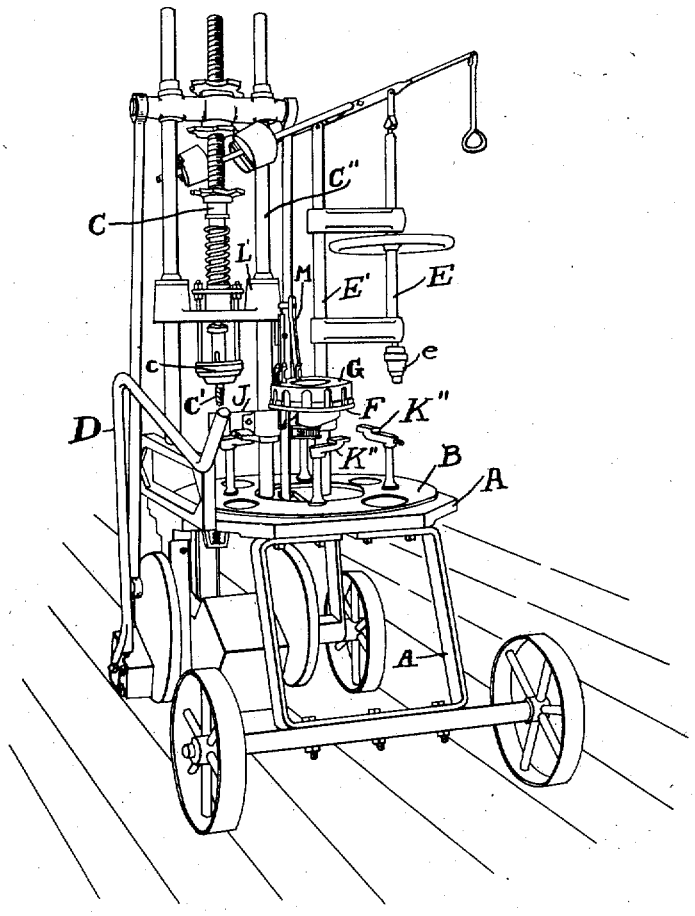

R. G. HEMINGRAY & C. HAWK.

SCREW PRESS TO FORM INSULATORS.

APPLICATION FILED APR. 19, 1913.

Reissued Dec. 23, 1913.

13,661.

3 SHEETS—SHEET 1.

Witnesses:
Frank A. Fahle
Josephine Gasper

Inventors
Ralph G. Hemingray,
Charles Hawk,
By Arthur M. Good
Attorney

R. G. HEMINGRAY & C. HAWK.
SCREW PRESS TO FORM INSULATORS.
APPLICATION FILED APR. 19, 1913.
Reissued Dec. 23, 1913.
13,661.
3 SHEETS—SHEET 2.
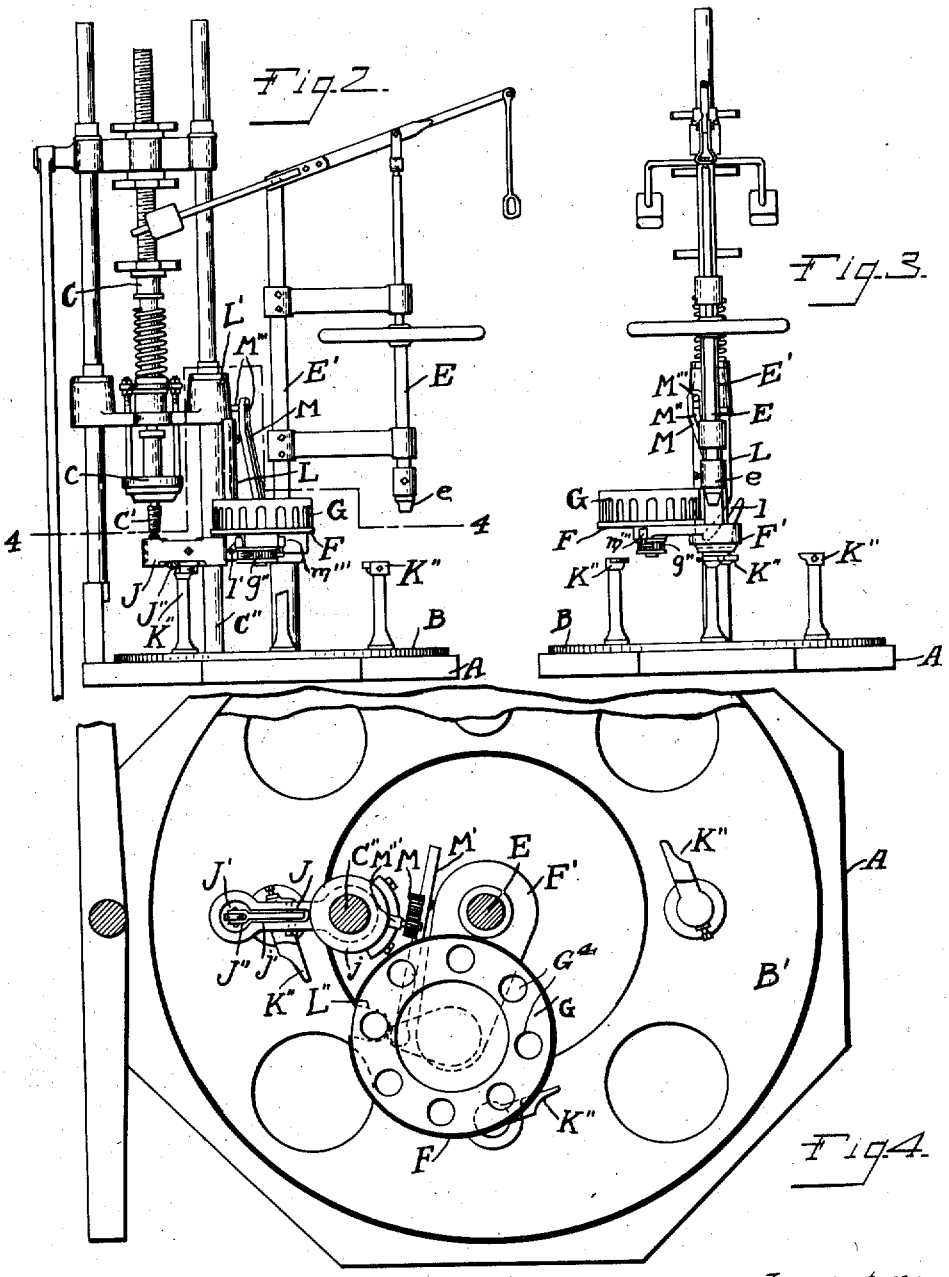
Witnesses
Frank A. Fahle
Josephine Gasper
Inventors
Ralph G. Hemingray,
Charles Hawk,
By Arthur M. Hood
Attorney

R. G. HEMINGRAY & C. HAWK.

SCREW PRESS TO FORM INSULATORS.

APPLICATION FILED APR. 19, 1913.

Reissued Dec. 23, 1913.

13,661.

3 SHEETS—SHEET 3.

Witnesses:
Frank A. Fahle
Josephine Gasper

Inventors
Ralph G. Hemingray,
Charles Hawk
By Arthur M. Hood
Attorney

UNITED STATES PATENT OFFICE.

RALPH G. HEMINGRAY AND CHARLES HAWK, OF MUNCIE, INDIANA, ASSIGNORS TO HEMINGRAY GLASS COMPANY, OF MUNCIE, INDIANA, A CORPORATION OF KENTUCKY.

SCREW-PRESS TO FORM INSULATORS.

13,661. Specification of Reissued Letters Patent. Reissued Dec. 23, 1913.

Original No. 909,595, dated January 12, 1909, Serial No. 387,922. Application for reissue filed April 19, 1913. Serial No. 762,418.

*To all whom it may concern:*

Be it known that we, RALPH G. HEMINGRAY and CHARLES HAWK, citizens of the United States, and residents of Muncie, in the county of Delaware and State of Indiana, have invented a certain new and useful Improvement in Screw-Presses to Form Insulators, of which the following is a full, clear, and exact description, reference being had to the accompanying drawings, which form a part of our specification.

Our invention relates to a press for forming insulators, in which a screw, to form the thread, is impressed in the molten glass at the time that the insulator is formed in the mold, and in which, after the glass has sufficiently hardened by cooling, the mold containing the insulator with the screw inserted in it, is presented to a rotary spindle, by means of which it is screwed out of, and withdrawn from, the hot glass, leaving the threads properly formed within the insulator. Prior to our invention it has been common to employ one operative in the use of such a machine, to insert a fresh screw in the plunger at each operation of the same.

The object of our invention is to do away with such operative, and to this end we have devised for a machine of the class described, an automatic attachment which supports a series of screws in position ready for use in the vicinity of the plunger, and which successively places a fresh screw in position in the plunger, after each operation.

In carrying out our invention we make use of a stationary plate which supports a number of the screws, and of an intermittently rotating ring, having sockets which determine the position of said screws with reference to the receiving and placing mechanism; and of an oscillating, socketed arm which alternately comes into position below a notch in said supporting plate to receive one of the screws as the said ring is intermittently operated to bring a screw above said notch, and then oscillates back into position below the plunger,—said socketed arm having within it a screw-supporting-trigger, which is at the proper time struck so as to raise the screw into position to be received and held by the plunger. Suitable cams and pawls, supported and operated by the plunger and table, give proper movement to the parts, as above described.

Figure 5:
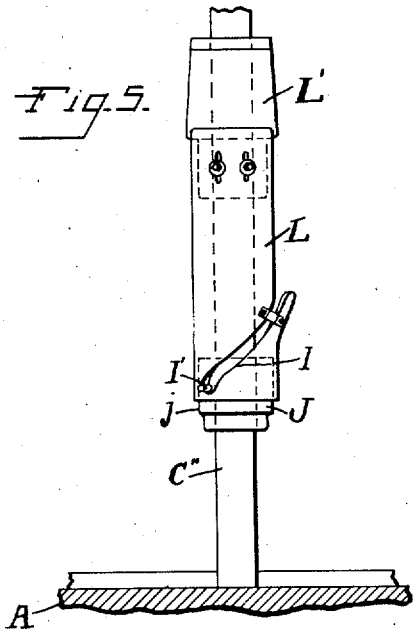
Figure 6:
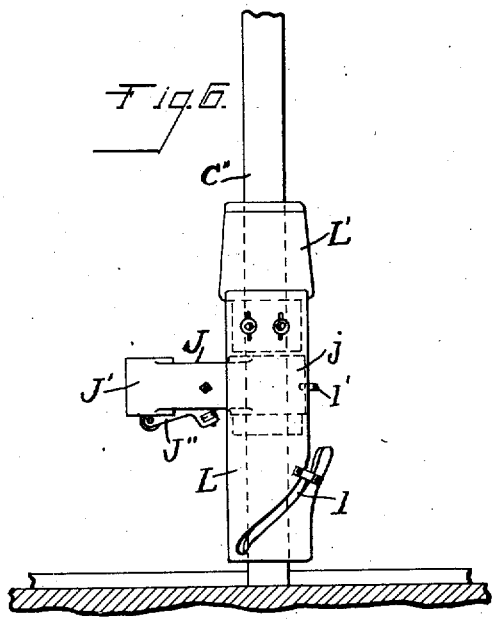
Figure 7:
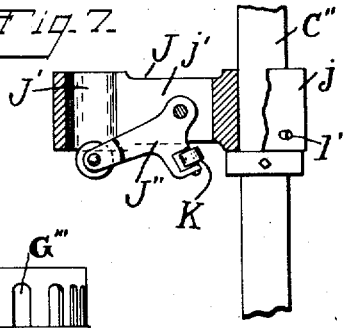
Figure 10:
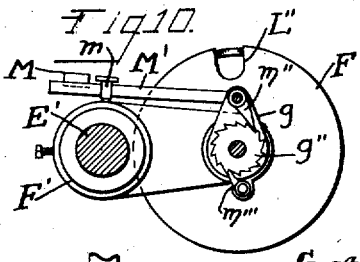
Figure 8:
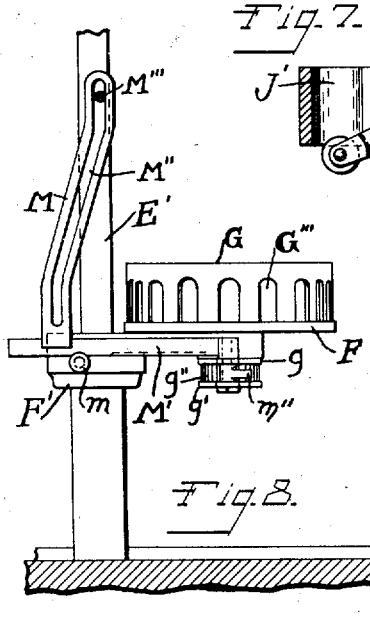
Figure 9:
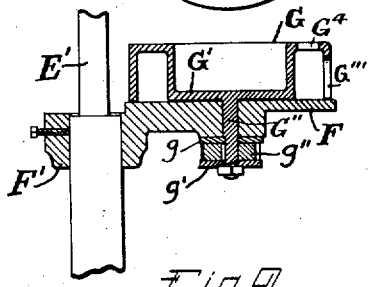

In the drawings:—Figure 1 is a perspective view of a screw press for forming insulators to which our improvement is attached; Fig. 2 is a front elevation of that portion of the machine above the rotating table; Fig. 3 is an elevation of the same mechanism looked at from the right of Fig. 2; Fig. 4 is a partial horizontal section on an enlarged scale on the lines 4—4 of Fig. 2; Figs. 5 and 6 are elevations at the limits of movement of one of the operating cams to be referred to later; Fig. 7 is a vertical section through the socketed arm which receives and delivers the screws to the plunger; Fig. 8 is an elevation of the supporting plate and intermittently rotating ring with the cam and arm operating the same; Fig. 9 is a vertical section through Fig. 8 in a plane parallel to the paper; and Fig. 10 is a detail view, looked at from the under side, of the mechanism operating the intermittently rotating disk.

The general features of the machine itself need no particular description as it is of the usual type, well known to the art and more particularly described in the patent to Kribs, No. 532,973, granted January 22nd, 1895. Briefly, such a press comprises a supporting framework A, a rotatable, mold-carrying table B, a depressible plunger C, an arm for operating the same, D, and a balanced rotatable spindle E. At the lower end of the plunger C is a socket *c* adapted, upon the insertion of the shank of one of the screws C′ to receive and hold it. The rotatable spindle E has any usual socket shank *e* with mechanism contained therein to release the screw shank after it has withdrawn the screw from the insulator in the mold.

F is the supporting plate, and G the intermittently rotating socketed ring, which together support the screws and thus form a magazine for the reception and successive automatic presentation of these glass-forming pins. The oscillating arm J receives the screws successively from the supporting plate and ring F, G, and delivers it to the socketed shank *c* in the plunger C. The plate F is provided with an extension F′ by means of which it is secured in any convenient manner to the vertical rod E′ which supports the rotary spindle E (see Figs. 3, 4, 8 and 9).

Ring G has a web G′ at the bottom and a downwardly projecting shank G″ by means of which it is journaled on the plate F. Plates $g$, $g'$, are loosely journaled on the shank G″ and between them is a ratchet $g''$ keyed to the shank G″. The parts are secured together by means of a nut and washer, or in any other suitable manner. The ring G is provided with a series of sockets $G^4$ of a size to receive the screws C′ and adjacent each of these sockets, the outer vertical face of the ring is cut out as indicated at G‴ in order to afford sufficient ventilation for the proper cooling of the threaded plunger pin.

The oscillating arm J is rotatably supported in any convenient manner upon the upright rod C″ which forms one of the guides for the plunger frame, and as illustrated, upon that one nearest the center of the table (see Figs. 1, 2, 4 and 7). This arm J, as shown, is cast in sections adapted to be screwed or bolted together, and said sections are of such shape, that when properly secured together, there is formed at one end a bearing $j$, which embraces the rod C″; at the other end, a socket J′, of a size to receive loosely one of the screws C′; and between the two, a slot $j'$ of substantially the depth of the arm itself, opening into the socket J′. A trigger J″ is pivoted in the slot $j'$. One end K, normally rests in the path of a series of cams K″ which are supported upon the table B. The ends of this trigger are preferably provided with rollers to reduce friction and to facilitate its operation.

A cam-plate L is bolted to one side of the yoke L′, which guides the plunger. This cam-plate is curved (see Figs. 2, 5 and 6), and is provided with a cam groove $l$, into which projects a pin $l'$ secured to the bearing $j$ of the arm J. This pin is preferably provided with an anti-friction roller. The slot $l$ is of such shape that, as the plunger and the cam-plate L, descend, the engagement of the pin $l'$ with the cam-groove $l$, causes the arm J to oscillate about the rod C″ as an axis, until it comes into position under a notched-out portion L″ in the plate F. The return movement of the plunger of course causes a reverse movement of the arm J so as to bring it back into its position immediately under the plunger itself.

M is another cam-plate (see Figs. 2, 3, 8 and 10) which serves to intermittently rotate the socketed ring G, so as to bring one of the sockets above the notched-out portion L″ in the plate F at each operation of the plunger. This cam is secured to a horizontal arm M′ (see Fig. 8), which is pivoted at one end to the plates $g$, $g'$, and near its other end rides on a flanged roller $m$, secured to the rod E′. A spring-controlled pawl $m''$ is journaled between the plates $g$, $g'$, in position to engage the ratchet $g''$. A back-pawl $m'''$ opposite the pawl $m''$ prevents back movement of the ratchet. The cam plate M is provided with the cam-slot M″ in which works a pin M‴ secured to the yoke L′ (see Figs. 2, 3 and 8). As the yoke descends, the movement of the pin M‴ in the cam slot M″ causes the bar M′ to rotate the plates $g$, $g'$, and with them the pawl $m''$, so as to move the ring G one notch. Upon the rise of the plunger the parts are taken back into their first position ready to rotate the ring at the next operation.

The operation of our improvement is apparent from this description. A number of screws are placed in the socketed ring G, the number being determined by the rapidity with which they cool, it being understood of course, that this number be not so large that when a screw reaches the position where it will be taken by the oscillating arm J, and delivered to the plunger, it has become too cold. Starting with the apparatus in the position where a fresh screw has been delivered to the plunger, and a mold, previously filled with molten glass, has been brought into position beneath the plunger; the initial portion of the downward movement of the plunger head L′ causes the cam groove $l$, acting upon pin $l'$, to quickly swing arm J from beneath the plunger and, as the downward movement of the plunger head L′ continues, the socket J′ of arm J is brought beneath opening L″ in plate F. At the same time pin M‴, moving down through groove M″ of the cam M, shifts the arm M′ so as to cause pawl $m''$ acting upon ratchet $g$ to advance the magazine G one step and thus bring a screw C′ opposite opening L″ and permit the said screw to drop into the socket J′ upon the roller at the adjacent end of the trigger J″. At the same time the downward movement of the plunger head L′ projects the previously-inserted screw C′ into the molten glass within the adjacent mold, the arm J remaining stationary beneath the magazine G during the lower portion of the downward movement of the plunger owing to the fact that, as indicated in Fig. 6, the cam groove $l$ is carried entirely below pin $l'$. When the downward movement of the plunger has been completed and a screw C′ has been embedded within the molten glass, the plunger head begins its upward movement, the socket $c$ withdrawing from the embedded screw C′ and leaving it within the glass in the mold. The initial upward movement of the plunger has no effect upon arm J but toward the latter portion of this movement cam slot $l$ is brought again into association with pin $l'$ and the arm J, with the new screw C′, is swung back into vertical alinement beneath the socket $c$. Thereupon the table B is rotated, either by hand or by common and suitable mechanism (not shown), in order to bring a freshly filled mold into pressing position beneath the plunger, and as this position is neared a cam K″ is brought into engagement with the end K of the trigger J″ so as to suddenly swing said trigger in such manner as to quickly project the screw C′ upwardly into the socket *c*, whereupon the operation above described is repeated. The molds containing the hot glass and the embedded screws, by the intermittent rotation of the table, are successively brought into position under the balanced rotatable spindle E. By the time this position is reached, the glass is sufficiently cooled to remove the screws, and as each mold is brought into this position, an operative depresses the spindle to engage and grasp the upwardly projecting shank of the screw, and then rotates the spindle to withdraw the screw in the usual manner, thus completing the formation of the thread in the insulator. The screw itself is then placed in a socket of the ring G, ready to be used again when its turn comes.

It will be readily understood by glass-workers, that, instead of the screws C′, other desirable glass-forming members, either for subsequent withdrawal from, or permanent embedment in the molten glass, may be used without departing from our invention.

We have shown and described herein a particular mechanism to carry out our invention, but of course do not wish to be limited to the mechanical details thereof, as it is apparent that they may be modified and changed without departing from the spirit of our invention.

We claim as our invention:

1. In a machine of the class described, a support adjacent the plunger, an arm adapted to oscillate between such support and said plunger, and mechanism operated by said plunger adapted to trip said support, and to oscillate said arm.

2. In a machine of the class described, a supporting member located adjacent the plunger and a delivering member adapted to receive a screw from the supporting member and deliver it to the plunger at each operation of the same.

3. In a machine of the class described, in combination with the plunger, a support for a series of screws adjacent the plunger, and automatic mechanism adapted to receive one of the screws from said support and deliver it to the plunger at each operation of the same.

4. In a machine of the class described, in combination with the plunger, a supporting member adapted to release the screws in succession, one at a time, and a delivery member moving between said supporting member and said plunger, adapted to receive and deliver to the plunger a fresh screw at each operation of said plunger.

5. In a machine of the class described, in combination with the plunger, a supporting member adapted to release the screws in succession, one at a time, a delivery member moving between said supporting member and said plunger, adapted to receive and deliver to the plunger a fresh screw at each operation of said plunger, and mechanism to produce the automatic movement of the parts.

6. In a machine of the class described, in combination with the plunger, a supporting member adapted to release the screws in succession, a delivery member moving between the supporting member and the plunger adapted to receive a screw and deliver it to the plunger at each operation of the same, and mechanism to produce the coöperative movement of the parts.

7. In a machine of the class described, in combination with the plunger, a supporting member adapted to release the screws in succession, a delivery member moving between the supporting member and the plunger, a trigger on said delivery member to catch and support a screw and movable to push the screw into place in the plunger, and mechanism to produce the coöperative movement of the parts at each operation of the plunger.

8. In a machine of the class described, in combination with the plunger, a supporting member comprising a fixed plate having a delivery opening, and a rotatable disk provided with holes to receive the screws, said holes passing in succession over said delivery opening, a delivery member moving between said plunger and said supporting member, adapted to receive and deliver a screw to the plunger at each operation of the same, and mechanism to produce the coöperative movement of the parts.

9. In a machine of the class described, in combination with the plunger, a fixed plate having a delivery opening, an intermittently rotating ring, located on said plate, provided with holes, one of said holes being brought above the delivery opening at each operation, an intermittently oscillating arm moving between said plunger and the delivery opening in said fixed plate, a supporting trigger connected to said oscillating arm, said trigger being movable in line with the axis of the plunger, and mechanism to produce the coöperative movement of the parts.

10. In a machine of the class described, in combination with the plunger and the rotatable table, a fixed plate having a delivery opening, an intermittently rotating ring located on said plate, provided with holes, one of said holes being brought above the delivery opening at each operation, an intermittently oscillating arm moving between said plunger and the delivery opening in said fixed plate, a supporting trigger connected to said oscillating arm, said trigger being movable in line with the axis of the plunger, and mechanism actuated by the plunger to rotate the said ring and to oscillate the said arm, and cams carried by the table to actuate the said trigger.

11. In a machine of the class described, in combination with the plunger and the rotatable table, a fixed plate having a delivery opening, an intermittently rotating ring located on said plate provided with holes, one of said holes being brought above the delivery opening at each operation, an intermittently oscillating arm moving between said plunger and the delivery opening in said fixed plate, a supporting trigger connected to said oscillating arm, said trigger being movable in line with the axis of the plunger, cams carried by said plunger adapted to intermittently oscillate said arm and rotate said ring, and cams carried by the table to operate said trigger.

12. In a machine of the class described, in combination with the plunger, a supporting member adapted to automatically release the screws in succession, and a delivery member adapted to automatically receive and deliver a fresh screw to the plunger at each operation of the same.

13. In a machine for working molten glass, the combination of a carrier for a plurality of molds movable successively into the press-position, a press-plunger arranged to coöperate successively with the molds of the mold carrier and provided with a holder formed to receive a glass-forming member, a magazine formed to receive and successively present a plurality of such glass-forming members, a transfer arm provided with means for receiving and holding successively such glass-forming members, and means coördinated with the plunger for shifting the transfer arm into alternate coordination with the magazine and plunger.

14. In a machine for working molten glass, the combination of a rotary table for a plurality of molds movable by said table successively into pressing position, a press plunger arranged to coöperate successively with the molds of the rotary table and provided with a holder formed to receive a glass-forming member, a rotary magazine formed to receive and successively present a plurality of such glass-forming members, a swinging transfer arm arranged adjacent the rotary table and the magazine and provided with means for receiving and holding successively such glass-forming members, and means coördinating with the plunger for swinging the transfer arm into alternate coördination with the magazine and plunger.

15. In a machine for working molten glass, the combination of a rotary table for a plurality of molds movable by said table successively into pressing position, a press-plunger arranged to coöperate successively with the molds of the rotary table and provided with a holder formed to receive a glass-forming member, a rotary magazine formed to receive and successively present a plurality of such glass-forming members, a swinging transfer arm arranged adjacent the rotary table and the magazine and provided with means for receiving and holding successively such glass-forming members, and a cam carried by the plunger and operating upon a portion of the swinging transfer arm to swing the same into alternate coordination with the magazine and plunger.

16. In a machine for working molten glass, the combination of a carrier for a plurality of molds movable successively into pressing position, a press plunger arranged to coöperate successively with the molds of the mold carrier and provided with a holder formed to receive a glass-forming member, a magazine formed to receive and successively present a plurality of such glass-forming members, a transfer arm provided with means for receiving and holding successively such glass-forming members, means coördinating with the plunger for shifting the transfer arm into alternate coördination with the magazine and plunger, and means for projecting such glass-forming members from the transfer arm into the plunger.

17. In a machine for working molten glass, the combination of a rotary mold-carrying table formed for a plurality of molds movable successively into pressing position, a press-plunger arranged to coöperate successively with the molds of the mold-carrier and provided with a holder formed to receive a glass-forming member, a rotary magazine formed to receive and successively present a plurality of such glass-forming members, a transfer member formed to receive successively such glass-forming members from the magazine, and means for reciprocating said transfer member both horizontally and vertically.

18. In a machine for working molten glass, the combination of a mold-carrying table formed for a plurality of molds movable successively into pressing position, a press-plunger arranged to coöperate successively with the molds of the mold carrier and provided with a holder formed to receive a glass-forming member, a magazine formed to receive and successively present a plurality of such glass-forming members, a transfer member formed to receive successively such glass-forming members from the magazine, and means for reciprocating said transfer member both horizontally and vertically.

19. In a machine for working molten glass, the combination of a rotary mold carrying table formed for a plurality of molds movable successively into pressing position, a press plunger arranged to coöperate successively with the molds of the mold carrier and provided with a holder formed to receive a glass-forming member, a rotary magazine formed to receive and successively present a plurality of such glass-forming members, a horizontally swinging transfer arm provided with a pocket formed to receive and hold successively such glass-forming members from the magazine, means for shifting the transfer arm into alternate registry with the magazine and plunger, a trigger arranged within the pocket of the transfer arm and movable vertically therein, and means for shifting said trigger to project the glass-forming member from said pocket into the plunger.

20. In a machine for working molten glass, the combination of a mold carrying table formed for a plurality of molds movable successively into pressing position, a press plunger arranged to coöperate successively with the molds of the mold carrier and provided with a holder formed to receive a glass-forming member, a magazine formed to receive and successively present a plurality of such glass-forming members, a horizontally swinging transfer arm provided with a pocket formed to receive and hold successively such glass-forming members from the magazine, means for shifting the transfer arm into alternate registry with the magazine and plunger, a trigger arranged within the pocket of the transfer arm and movable vertically therein, and means for shifting said trigger to project the glass-forming member from said pocket into the plunger.

In witness whereof, we have hereunto set our hands at Muncie, Indiana, this 15th day of April, A. D. one thousand nine hundred and thirteen.

RALPH G. HEMINGRAY.
CHAS. HAWK.

Witnesses:
JOHN C. GRAY,
EVAN T. KEENE.